(12) United States Patent
Juretus et al.

(10) Patent No.: US 11,971,987 B2
(45) Date of Patent: Apr. 30, 2024

(54) REDUCING LOGIC LOCKING KEY LEAKAGE THROUGH THE SCAN CHAIN

(71) Applicant: Drexel University, Philadelphia, PA (US)

(72) Inventors: Kyle Joseph Juretus, Quakertown, PA (US); Ioannis Savidis, Wallingford, PA (US)

(73) Assignee: Drexel University, Philadelphia, PA (US)

( * ) Notice: Subject to any disclaimer, the term of this patent is extended or adjusted under 35 U.S.C. 154(b) by 69 days.

(21) Appl. No.: 17/480,771

(22) Filed: Sep. 21, 2021

(65) Prior Publication Data

US 2023/0090772 A1 Mar. 23, 2023

(51) Int. Cl.
*G06F 21/55* (2013.01)
*G06F 21/76* (2013.01)

(52) U.S. Cl.
CPC ............ *G06F 21/556* (2013.01); *G06F 21/76* (2013.01); *G06F 2221/034* (2013.01)

(58) Field of Classification Search
CPC ... G06F 21/556; G06F 21/76; G06F 2221/034
USPC .......................................................... 726/23
See application file for complete search history.

(56) References Cited

U.S. PATENT DOCUMENTS

| | | | | |
|---|---|---|---|---|
| 2019/0018936 A1* | 1/2019 | Zhou | ...................... | H04L 9/3239 |
| 2019/0129892 A1* | 5/2019 | Sinanoglu | ............. | G06F 16/252 |
| 2020/0342142 A1* | 10/2020 | Savidis | .................... | G06F 21/75 |
| 2021/0406405 A1* | 12/2021 | Tanami | ................. | H04L 9/0825 |
| 2023/0177245 A1* | 6/2023 | Sinanoglu | ............. | G06F 30/337 |
| | | | | 716/100 |

OTHER PUBLICATIONS

Limaye et al., "Thwarting All Logic Locking Attacks: Dishonest Oracle with Truly Random Logic Locking", IEEE: Transactions on Computer Aided Design of Integrated Circuits & Systems, vol. 40, No. 9, Sep. 2021, 14 pages.

* cited by examiner

*Primary Examiner* — Michael S McNally
(74) *Attorney, Agent, or Firm* — Schott, P.C.

(57) ABSTRACT

A proposed technique allows for the security of the logic cone through logic locking and secures the outputs of the circuit from the scan chain without modifications to the structure of the scan chain. Since the oracle responses in test mode do not correspond to the functional key, satisfiability (SAT) attacks are not able to leverage the responses from the scan chain. In addition, a charge accumulation circuit is developed to prevent and detect any attempt to enter the partitioned test mode while the correct circuit responses are still stored within the registers.

12 Claims, 9 Drawing Sheets

| NAND | AND | NOR | OR | XNOR | XOR |
|------|-----|-----|-----|------|------|
| 9.2% | -17.4% | 9.2% | -17.4% | -26.4% | -26.4% |

FIG. 6

| Benchmark | Area | | | Power | Num. CA Circuits | Num. of Flip-Flops | Num. of Gates |
|---|---|---|---|---|---|---|---|
| | CA | [24] | [20] | | | | |
| s27 | 11.34% | 62.05% | 5.44% | 32.01% | 1 | 3 | 8 |
| s208 | 5.31% | 47.92% | 4.15% | 17.80% | 1 | 8 | 61 |
| s382 | 4.38% | 23.85% | 4.91% | 18.95% | 2 | 21 | 99 |
| s838 | 3.45% | 15.49% | 4.05% | 6.28% | 1 | 32 | 241 |
| s9234 | 5.49% | 9.97% | 6.95% | 11.64% | 9 | 211 | 2027 |
| s15850 | 2.87% | 5.71% | 4.89% | 5.50% | 33 | 534 | 3448 |
| s35932 | 7.59% | 5.52% | 5.20% | 43.49% | 128 | 1728 | 12204 |

FIG. 7

REDUCING LOGIC LOCKING KEY LEAKAGE THROUGH THE SCAN CHAIN

STATEMENT REGARDING GOVERNMENT SUPPORT

This invention was made with government support under Contract No. FA8075-14-D0055/DSTAT-15-1196 awarded by the Air Force Research Laboratory. The government has certain rights in the invention.

BACKGROUND

Malicious modifications to integrated circuits (ICs) represent a serious threat to the security of the entire computing stack, with backdoors and a variety of counterfeit components having already been discovered within military ICs. The security threats at the hardware level are expected to increase as the IC design and manufacturing flow transitions to a horizontal model, where fabrication, testing, and intellectual property (IP) are procured from third-parties. Untrusted third parties throughout the IC design and manufacturing flow possess the ability to steal IP, counterfeit and overproduce ICs, and insert harmful circuit modifications (hardware Trojans).

One of the primary areas of research to protect hardware against untrusted third-parties within the IC design and fabrication flow is the use of obfuscation. Obfuscation limits the amount of topological information on the circuit an adversary is able to recover, with split manufacturing, IC camouflaging, and logic encryption/locking all considered forms of obfuscation. Satisfiability (SAT) based attacks have resulted in increased concern over the ability of obfuscation techniques to adequately secure against reverse engineering. SAT based attacks utilize a miter circuit of the obfuscated netlist to generate input patterns that are then applied to an activated IC, which efficiently constrains the key space. Many techniques have been developed to limit the efficiency of the SAT attack. However, the techniques become increasingly ineffective if an IC is partitioned into smaller circuit blocks through the availability of the scan-chain, which allows for the execution of a targeted SAT attack on each of the smaller circuit partitions. Even techniques that provide increased resilience against the SAT attack are left vulnerable through the scan chain as the circuit partitions are potentially small enough in scale to permit brute force attacks. Securing the scan chain is, therefore, a critical requirement to secure the IC.

A variety of scan chain security techniques have been proposed. Some insert a key dependency into the scan chain to prevent unauthorized utilization. Others place a MUX after certain registers within the circuit, with the select line used as the key. And still others insiert XOR gates into the scan chain with the key implemented using a linear-feedback shift register (LFSR).

SUMMARY OF THE EMBODIMENTS

The proposed techniques focus on securing the contents of the scan chain, which leaves the combinational logic between registers vulnerable to IP theft through reverse engineering. Securing the combinational logic cone requires the addition of obfuscation circuitry, which increases the overhead in the area and power of the IC. In addition, a scan chain-based SAT attack (ScanSAT) has been introduced that exposes the scan chain key.

The technique creates a logical partition between the functional and test modes of a circuit, where the correct logic locking key is only to render the circuit functional provided in functional mode. The proposed technique allows for the security of the logic cone through logic locking and secures the outputs of the circuit from the scan chain without modifications to the structure of the scan chain. Since the oracle responses in test mode do not correspond to the functional key, satisfiability (SAT) attacks are not able to leverage the responses from the scan chain. In addition, a charge accumulation circuit is developed to prevent and detect any attempt to enter the partitioned test mode while the correct circuit responses are still stored within the registers. The charge accumulation circuit results in a 9.2% increase in area as compared to a minimum sized 180 nm 2-input NAND gate. Implementing the technique on the ISCAS'89 s15850 benchmark circuit results in a 2.87% increase in the total area.

The proposed technique secures against SAT and ScanSAT by partitioning the IC into test and functional modes, which allows for a separate key when in test mode. The logic cone is already secured by logic locking and the security of the scan chain is due to mode partitioning. In addition, a charge accumulation circuit is developed to sense any attempt to bypass the transition into test mode.

BRIEF DESCRIPTION OF THE DRAWINGS

FIG. 1(b) shows the activation pattern of the scan chain. When SE is high, the flip-flops form a scan chain and sequentially output the internal state of the IC through the SO pin. Activation of the scan chain begins with SE set to logic high to scan in and store a specific data pattern to the registers. SE is then transitioned to logic low to capture the circuit response through the combinational logic at the functional frequency of the circuit, and then switched back to logic high again to scan out the test response.

FIGS. 5(a)-5(c) show implementation of the scan chain technique on the ISCAS'89 s27 benchmark circuit where FIG. 5 (a) depicts a schematic of s27 with the red X representing the location where the charge accumulation circuit is inserted (includes an XOR)

DETAILED DESCRIPTION OF THE EMBODIMENTS

Introduction

Figure 1A:
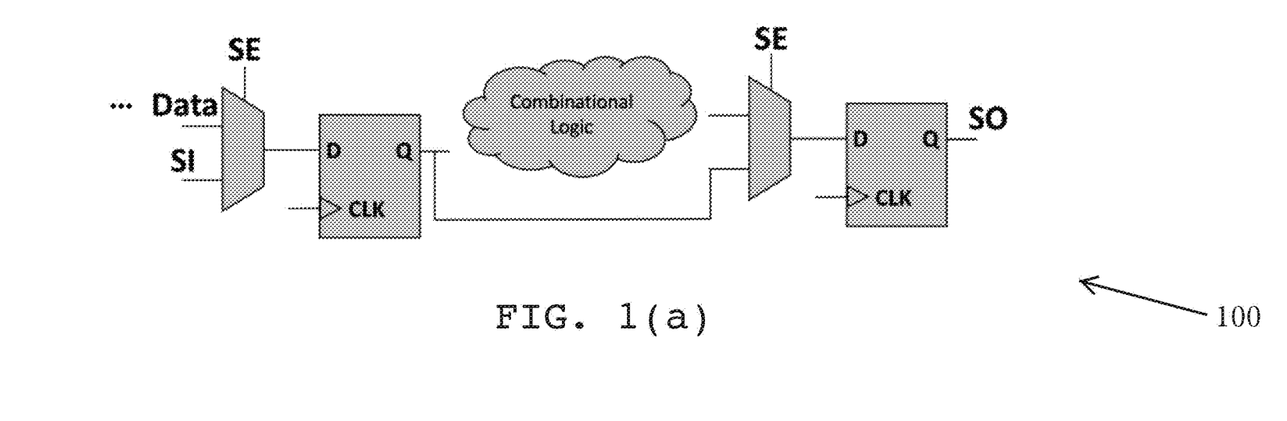
FIG. 1(a) shows the mux-based scan circuitry to output the internal state of an IC, where the scan enable (SE), clock (CLK), scan in (SI), and scan out (SO) signals are applied.

ICs typically contain an internal state that is updated via a clock signal, forming a synchronous dependency within the circuit. The internal state is not inherently observable or controllable through the primary inputs and outputs of the IC, which results in challenges when testing the circuit. A scan chain structure is, therefore, inserted to improve the observability and controllability of the internal states of the circuit. One implementation of a scan chain utilizes a multiplexer (MUX) based architecture 100 as shown in FIG. 1(a).

Figure 1B:
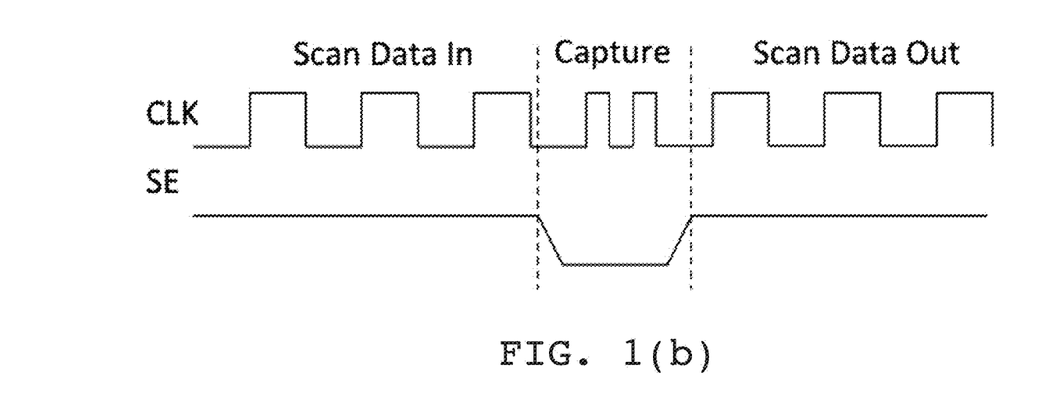

The inserted scan chain allows for the control and subsequent observation of the internal states of the circuit using a shift register like structure. The typical activation pattern of a scan chain structure is shown in FIG. 1(b). The scan enable (SE) signal is first applied high to set the flip-flops to shift register mode. Data is then read in from the scan input (SI) port shown in FIG. 1(a). A slower frequency is applied in test mode to limit the power consumption and control the temperature of the IC as the increased switching activity during test mode results in as much as a 2× increase in the nominal power consumption. The SE signal is then set to low, with the clock (CLK) returning to a functional frequency to capture the at-speed response of the IC for the input vector provided through the scan chain. After the response is captured, the SE signal is once again set to high while the clock signal is returned to the frequency used for test, which allows for the readout of the captured response through the scan out (SO) port.

The increased controllability and observability permitted through the use of a scan chain is beneficial for testing the IC, but allows adversaries to more efficiently execute SAT based attacks. While logic locked circuits are vulnerable to attack without scan chain access, the computational cost of executing such attacks is much greater when scan chain access is not available. For example, assuming access to the scan chain of the s526 benchmark circuit, an oracle guided attack completes in 2.41 seconds as compared to a minimum time of completion of 37,979 seconds when no scan chain access is available.

Securing the Scan Chain

Figure 2:
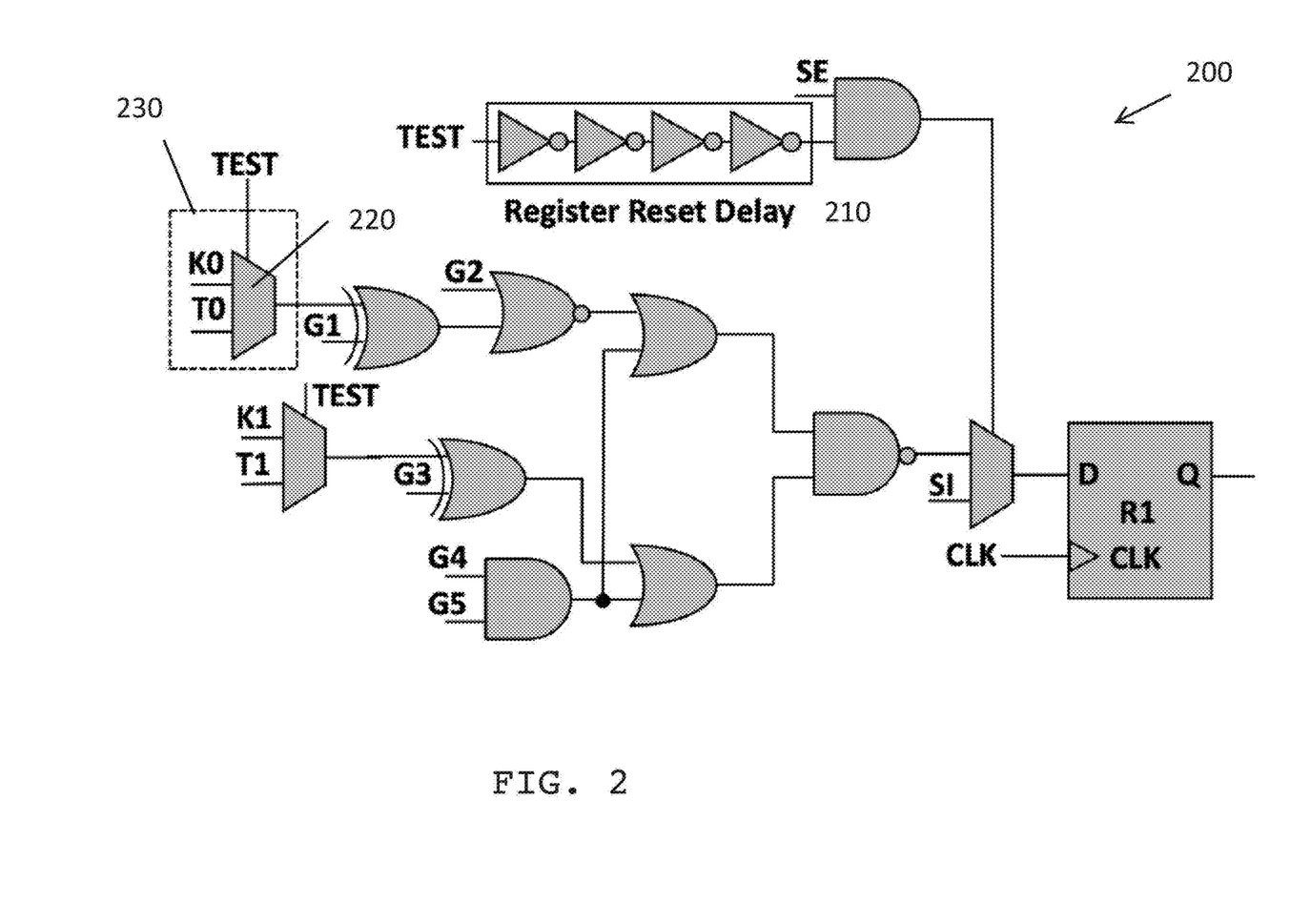
FIG. 2 shows a circuit implementing functional and test mode partitioning. When TEST is set high, the key values are no longer propagated to XOR-based logic locking gates. The registers are reset when a transition on the TEST signal occurs, erasing any state information stored from the functional mode. Scan mode is only available when the TEST signal is high.

In order to secure the circuit while in test mode, a partition between the test and functional operating modes of the partitioned circuit 200 is generated, as shown in FIG. 2. Whenever entering the partition, the TEST signal must be asserted to logic high, which results in applying an incorrect key to the key gates. Instead, a static logic 0 or logic 1 test input TI is applied to test the functionality of the circuit. In addition, when the IC is transitioning into or out of test mode, the contents of the registers are reset to logic 0 to prevent any leakage of the functional state from the scan chain. The ability to enter scan mode is delayed until the contents of the registers are cleared, represented by the delay line 210 shown in FIG. 2. Once the registers are cleared, standard operation of the scan chain resumes by enabling scan mode (SE), which allows for testing of the internal logic of the circuit. The proposed technique requires no modifications to the structure of the scan chain, which allows for efficient gains in security without sacrificing testability.

By shielding the functional key in test mode, the oracle responses do not reveal information regarding the logical topology set by the functional key. Therefore, the SAT and ScanSAT attacks are no longer capable of pruning the keyspace.

Figure 3:
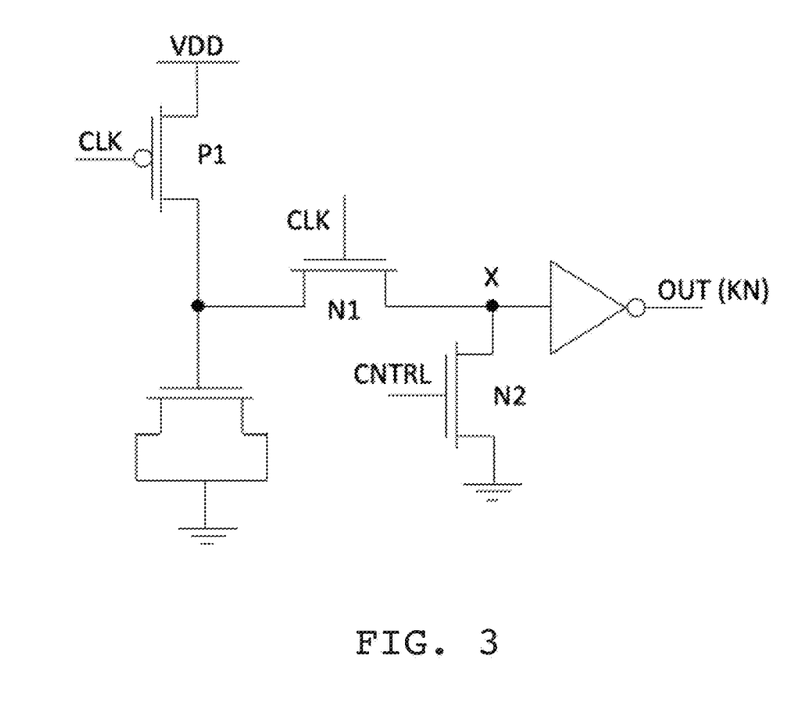
FIG. 3 shows a charge accumulation circuit where the MOS based capacitor is charged when CLK=0 and discharged through the NMOS resistive switch N2 when CLK=1. A skewed inverter is used to rectify the signal to logic 0 or logic 1.

To circumvent the test and functional mode partitions, an adversary must keep TEST at logic 0 while enabling the scan chain. The singular origin of the modified signal that sets the IC into scan mode creates an increased susceptibility to a fault injection or focused ion beam attack. In order to increase the spatial disparity of the circuit that enables scan chain operation throughout the circuit, as well as have the ability to detect an attempt to scan out the state of the circuit without being in test mode, the charge accumulation circuit shown in FIG. 3 is proposed. The MUX 220 within the dashed box 230 shown in FIG. 2 represents the gate replaced by the charge accumulation circuit. The charge accumulation circuit no longer requires setting the TEST signal to logic high to mask the key. Rather, the charge accumulation circuit senses the change in frequency when scanning in input/output responses so that even if the test signal is forced low while scan enable is high, the oracle responses differ from when the circuit is in functional mode. The charge accumulation circuit also allows for the detection of tampering when the scan signal is high but the test signal is low, which prevents an attacker from deleting the key.

The charge accumulation circuit stores charge on the capacitor when the clock signal (CLK) is logic 0 and then discharges the capacitor when CLK is logic 1. The rate of discharge of the capacitor when the CLK signal is high is determined by the voltage applied to the gate of transistor N2 shown in FIG. 3. A clock frequency that is faster than the discharge rate of the capacitor maintains a logic 1 at node X, which results in a logic 0 at the output of the skewed inverter. The inverter contains a stronger PMOS to pull up the circuit to VDD at a lower input voltage.

Figure 4A:
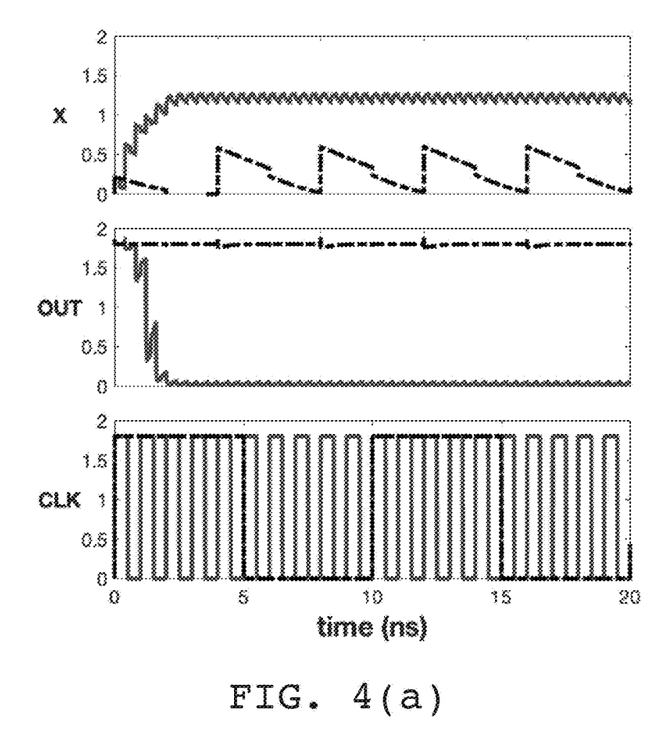
FIGS. 4(a) and 4(b) show simulation of the capacitor accumulation circuit shown in FIG. 3 with a control voltage (CNTRL) of FIG. 4(a) 363 mV and FIG. 4(b) 1.8 V applied to the pull-down network (transistor N2). The gray solid line represents the circuit response when a functional clock frequency of 1 GHz is applied. The black dashed line represents the 100 MHz frequency used when the circuit is in scan mode.
Figure 4B:
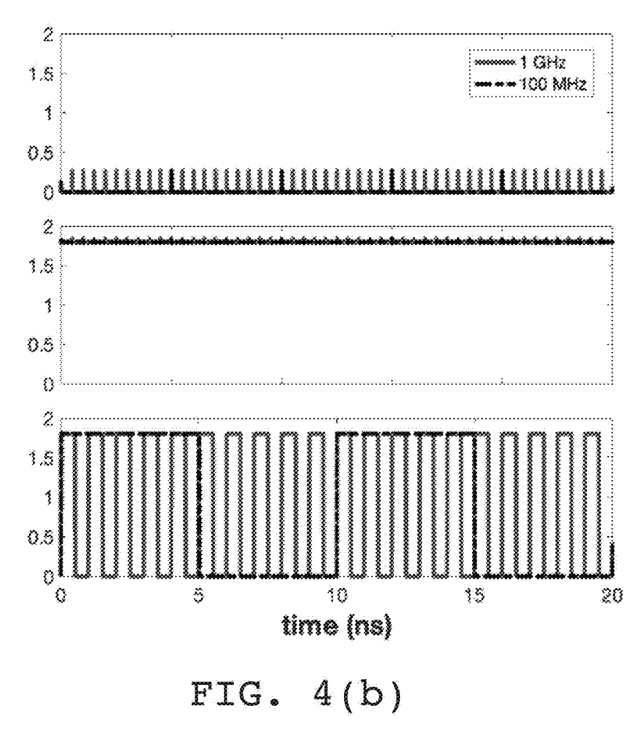

The functional frequency of the circuit was set to 1 GHz and the test mode frequency to 100 MHz. The output of the circuit for input frequencies of 1 GHz and 100 MHz is shown in FIG. 4. When a voltage of 363 mV is applied to the pull down transistor (CNTRL in FIG. 3), the 1 GHz clock frequency (CLK) does not permit node X to discharge, resulting in a constant logic 0 at the output of the skewed inverter. However, when a 100 MHz frequency is applied, the charge on the capacitor is depleted over time, which results in a logic 1 at the output.

The key for the charge accumulation circuit, therefore, becomes the applied CNTRL voltage to the circuit. For the simulated circuit, a voltage of 363 mV applied to the CNTRL node generates a logic 0 when the functional frequency is applied, while a constant logic 1 is generated at OUT when applying 1.8 V (logic high) to CNTRL. For the circuit shown in FIG. 3, the selection between the 363 mV and 1.8 V inputs to the MUX requires the implementation of a digital key bit for each instance of the charge accumulation circuit.

A. Circuit Analysis

Figure 6:
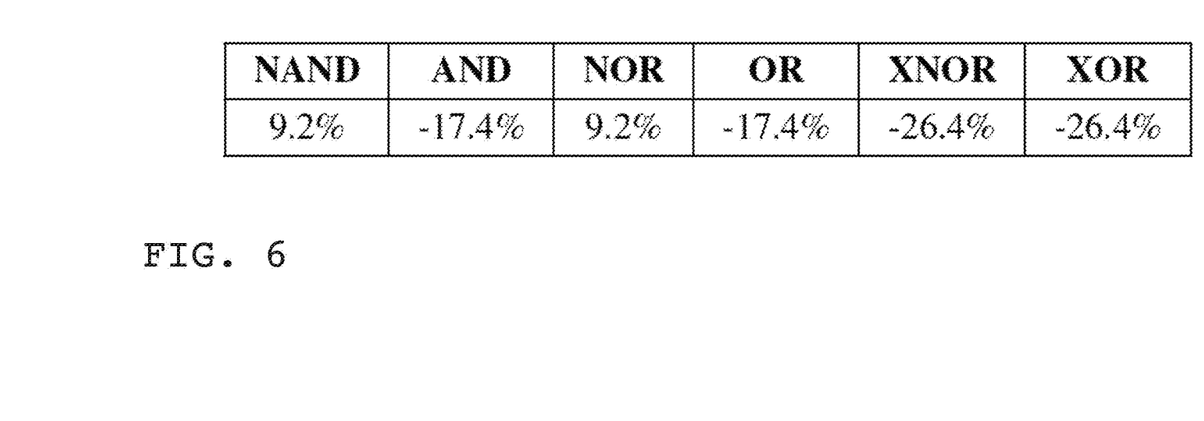
FIG. 6 shows Table I that shows area overhead of the charge accumulation circuit shown in FIG. 3 as compared to minimum sized 2-input standard cells in a 180 nm technology. A negative overhead implies a smaller area then the standard cell.

SPICE simulation indicates that the charge accumulation circuit functions correctly for CNTRL voltages of 339 mV to 407 mV, representing a swing of 18.7% of the nominal CNTRL voltage of 363 mV. The range of CNTRL voltages represents 3.8% of the 1.8 V supply voltage when a 0 V ground is assumed. For a CNTRL voltage greater than 407 mV, a 10% reduction in the voltage of the output node of the circuit is observed as compared to the 1.8 V power supply. The charge accumulation circuit was implemented with minimally sized transistors except for the skewed inverter, which results in a small penalty in area as compared to the standard cells. The percentage difference in area as compared to minimally sized 2-input standard cells from a 180 nm process is listed in FIG. 6, Table I. The proposed charge accumulation circuit requires an additional area of 9.2% as compared to a minimally sized 2-input NAND gate, which implies a negligible impact to the total area of the original logic cone.

Evaluation

Figure 5A:
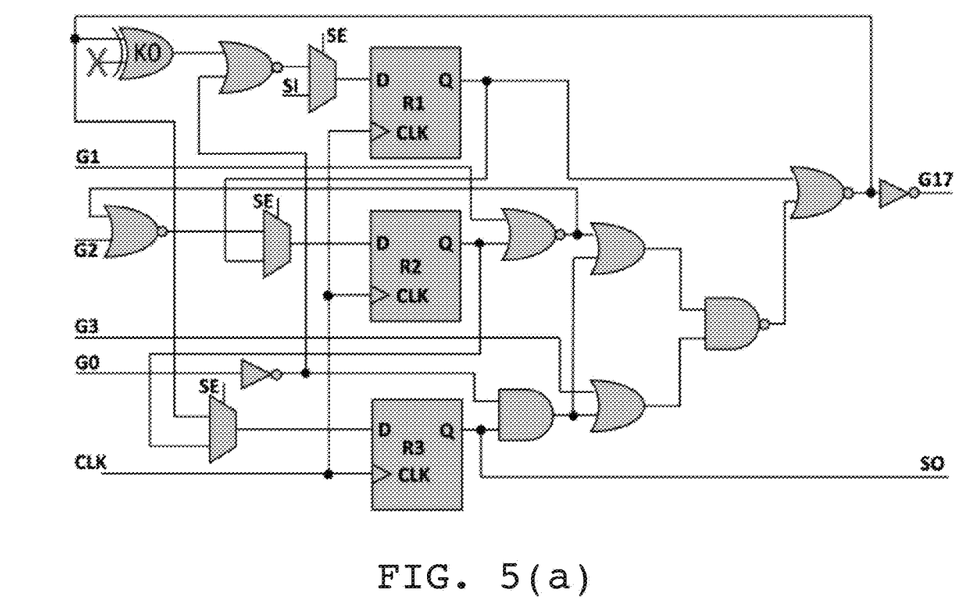
Figure 5B:
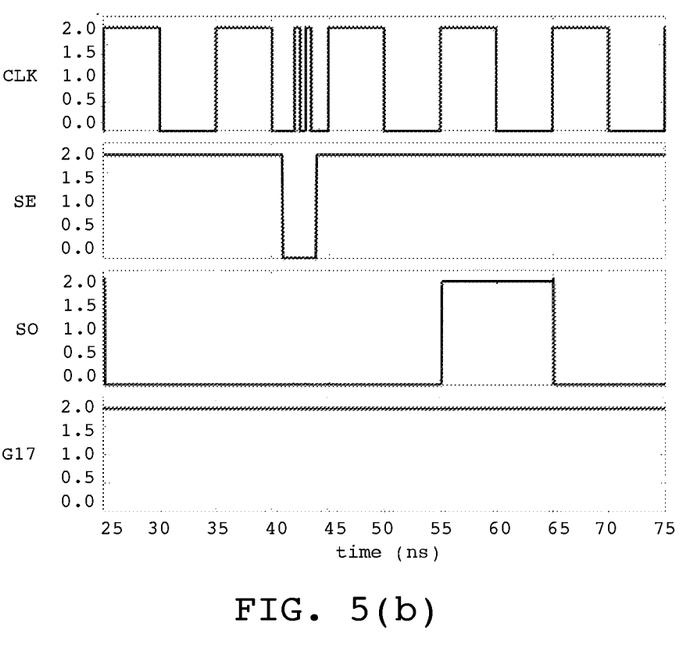
FIG. 5(b) shows scan operation of s27 for an input sequence of G0=1, G1=0, G2=1, and G3=0 and scan-in (SI) pattern of all logic 0s.

The ISCAS'89 benchmark circuits are implemented for the analysis of the proposed scan chain technique described in Section III. The schematic of s27 is shown in FIG. 5(a). The s27 circuit was modified by inserting a MUX based scan chain structure, with register R1 connected to the scan-in port and register R3 connected to the scan-out port. The circuit is evaluated for inputs of G0=1, G1=0, G2=1, and G3=0, with results shown in FIG. 5(b). The circuit is first switched into scan mode and a scan-in sequence of all logic 0s is applied at a clock frequency of 100 MHz. Scan mode is then disabled, switching to a frequency of 1 GHz to capture the functional response of the circuit. The response from the combinational logic of the circuit is outputted through the scan-out (SO) port by setting the circuit to scan mode again, which shifts out the internal state of R3=0, R2=0, and R1=1 and the primary output of G17=1.

Figure 5C:
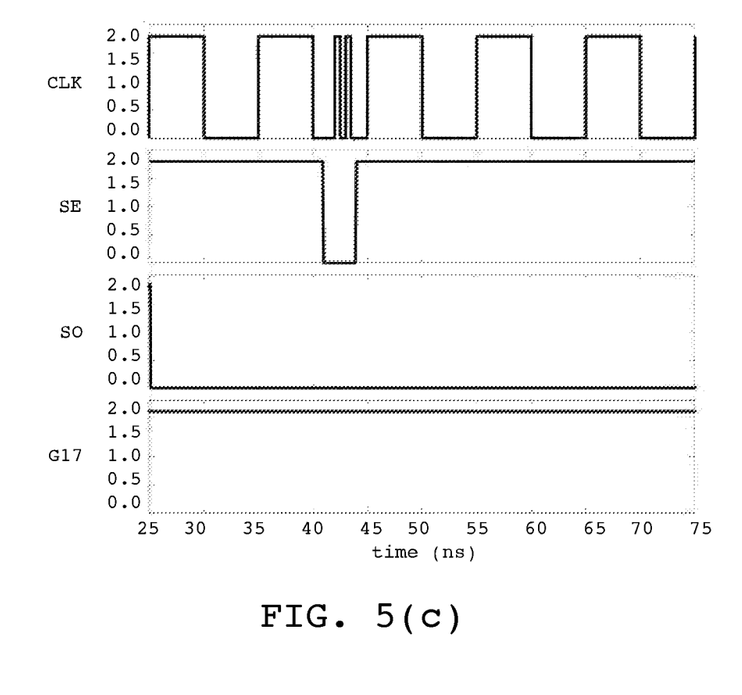
FIG. 5(c) shows scan operation of s27 that includes an XOR and the charge accumulation circuit for an input sequence of G0=1, G1=0, G2=1, and G3=0 and SI pattern of all logic 0s.

The s27 benchmark circuit is then modified to include the test and functional mode partitions as well as the charge accumulation circuit described in Section III. The X shown in FIG. 5(a) represents the location of the inserted charge accumulation circuit. The circuit is re-evaluated for the same input pattern of G0=1, G1=0, G2=1, and G3=0 with a scan-in pattern of all logic 0s when the circuit is in test mode. The simulation results are provided in FIG. 5(c). The stored value in register R1 is now a logic 0 due to the addition of the charge accumulation circuit, which results in a scan-out response of all logic 0s from the circuit. An adversary is unable to recover accurate responses from the active IC while in scan mode, limiting the analysis of the input/output pairs used to verify and constrain the generated DIPs from the miter circuit used to execute the SAT attack.

Figure 7:
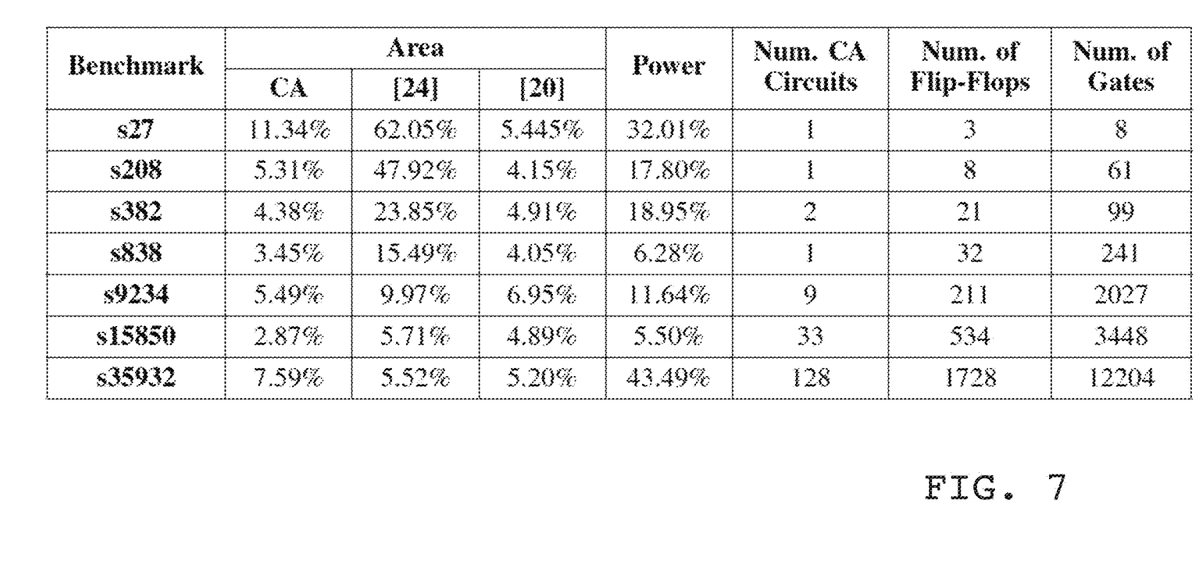
FIG. 7 shows Table II that shows area overhead for a subset of ISCAS89 benchmark circuits when implementing the proposed charge accumulation (CA) technique. The overhead in power for the CA technique is also listed.

The area and power overheads for a subset of the ISCAS'89 benchmark circuits are listed in FIG. 7, Table II. A charge accumulation circuit was inserted for each group of strongly connected registers, which implies the state transition logic of the registers includes common logical gates. Most of the benchmark circuits result in an approximately 5% increase in area, with s27 and s35932 resulting in the largest increase. The overhead in area for s27 is large as the circuit is small, which implies that a greater percentage of the total area is needed to implement the charge accumulation circuit. The increase in the area of s35932 is due to the implementation of the charge accumulation blocks on 128 register groups within the circuit. Reducing the number of inserted charge accumulation circuits while still providing a high degree of incorrect input-output responses when in scan mode results in a lower overhead in the total area of the secured s35932 benchmark circuit.

The estimated overhead in area of the proposed charge accumulation circuit was compared to earlier techniques. The area to implement the technique in the art was estimated for a maximum length in the input scan chain of 10 registers and an XOR insertion rate of 30% of all registers within each chain. Note that the overhead of implementing the linear-feedback shift register (LFSR) is not included in the analysis. The area for the technique described in other prior art was estimated by assuming that 30% of all registers include an obfuscation element. The technique in the prior art results in a high overhead in area for smaller sized circuits, with the overhead decreasing as the size of the circuit increases. The overhead in area across all three techniques is similar for circuits of larger size. However, only the proposed charge accumulation technique offers protection against reverse engineering of the combinational logic of the circuit. In addition, the proposed technique is the only one of the three that is not susceptible to the ScanSAT attack as the functional mode and test mode keys differ.

The average power consumption of the charge accumulation technique was analyzed, which is also listed in FIG. 7, Table II. The switching activity of the charge accumulation circuit is set to 50%, which represents high circuit activity and, therefore, accounts for the significant increase in the total power consumption. The functional frequency of all implemented circuits was 1 GHz. Slightly relaxing the constraint on the frequency provides a means to reduce the power consumption by allowing the synthesis tool to utilize gates with lower drive strength.

CONCLUSIONS

A methodology to secure the scan chain while also providing added obfuscation of the logic cone is presented in this technique. The technique creates a partition between the functional and test mode operation of the circuit, which prevents scan chain responses from leaking information regarding the functional key. The separation of the functional and test modes requires no modifications to the structure of the scan chain and does not reduce design testability. In addition, a charge accumulation circuit is proposed to detect the decrease in frequency when transitioning into scan mode. The charge accumulation circuit reduces the susceptibility to an adversary subverting the test mode partition. The proposed partitioned modes and charge accumulation circuit provide a low cost approach to secure the scan chain and add obfuscation to the logic cone. The overhead in area of the charge accumulation circuit is 9.2% as compared to a minimum sized 2-input NAND gate in a 180 nm technology. The proposed technique results in a 2.87% overhead in area when implemented to secure the ISCAS'89 s15850 benchmark circuit.

While the invention has been described with reference to the embodiments above, a person of ordinary skill in the art would understand that various changes or modifications may be made thereto without departing from the scope of the claims.

We claim:

1. An integrated circuit comprising a logical partition between functional and test modes of the integrated circuit, wherein a correct logic locking key is only provided in the partitioned functional mode, and wherein when the integrated circuit is transitioning into or out of the partitioned test mode, contents of registers are reset to logic 0.

2. The integrated circuit of claim 1, wherein outputs of the integrated circuit are secured from a scan chain without modifications to a structure of the scan chain.

3. The integrated circuit of claim 1, wherein the integrated circuit further comprises a charge accumulation circuit that prevents and detects attempts to enter the partitioned test mode while correct circuit responses are stored within the registers.

4. The integrated circuit of claim 1, wherein when a TEST signal enters the logical partition, the TEST signal is set to logic high, which results in applying an incorrect key to key gates.

5. The integrated circuit of claim 4, wherein a static logic 0 or logic 1 test input is applied to test the functionality of the integrated circuit.

6. The integrated circuit of claim 5, wherein the contents of the registers are reset to logic 0 to prevent leakage of the partitioned functional mode from a scan chain.

7. The integrated circuit of claim 6, wherein scan mode entry is delayed until the contents of the registers are cleared.

8. The integrated circuit of claim 7, wherein once the registers are cleared, standard operation of the scan chain resumes by enabling scan mode, which allows for testing of the internal logic of the integrated circuit.

9. The integrated circuit of claim 1, further comprising a charge accumulation circuit, wherein the charge accumulation circuit senses a change in frequency when scanning in input/output responses so that if a test signal is forced low while scan enable is high, oracle responses differ from when the integrated circuit is in the partitioned functional mode.

10. The integrated circuit of claim 9, wherein the charge accumulation circuit allows for detection of tampering when a scan signal is high but the test signal is low, which prevents an attacker from deleting the key.

11. The integrated circuit of claim 10, wherein the charge accumulation circuit stores charge on a capacitor of the integrated circuit when a clock signal is logic 0 and then discharges the capacitor when the clock signal is logic 1.

12. The integrated circuit of claim 11, wherein a rate of discharge of the capacitor when the clock signal is high is determined by a voltage applied to a gate of a transistor.

* * * * *